US007376471B2

(12) United States Patent
Das et al.

(10) Patent No.: US 7,376,471 B2
(45) Date of Patent: May 20, 2008

(54) SYSTEM AND METHOD FOR EXPLOITING A GOOD STARTING GUESS FOR BINDING CONSTRAINTS IN QUADRATIC PROGRAMMING WITH AN INFEASIBLE AND INCONSISTENT STARTING GUESS FOR THE SOLUTION

(75) Inventors: Indraneel Das, Bronx, NY (US); Gonzalo Rey, Clarence Center, NY (US)

(73) Assignee: United Technologies Corporation, Hartford, CT (US)

( * ) Notice: Subject to any disclaimer, the term of this patent is extended or adjusted under 35 U.S.C. 154(b) by 271 days.

(21) Appl. No.: 11/358,735

(22) Filed: Feb. 21, 2006

(65) Prior Publication Data

US 2007/0198446 A1    Aug. 23, 2007

(51) Int. Cl.
*G06F 17/10* (2006.01)
*G06F 15/18* (2006.01)
*G05B 13/02* (2006.01)

(52) U.S. Cl. .......................... 700/28; 700/33; 700/53; 706/21; 703/2

(58) Field of Classification Search ............ 700/28–34, 700/37, 44, 52, 53, 73, 74; 703/2, 22; 706/21; 708/446
See application file for complete search history.

(56) References Cited

U.S. PATENT DOCUMENTS

| | | | | |
|---|---|---|---|---|
| 4,602,324 A | * | 7/1986 | Fujawa et al. ................. 700/1 |
| 5,394,322 A | * | 2/1995 | Hansen .......................... 700/37 |
| 5,548,293 A | * | 8/1996 | Cohen ..................... 342/357.11 |
| 5,628,199 A | * | 5/1997 | Hoglund et al. ............... 62/155 |
| 5,642,722 A | * | 7/1997 | Schumacher et al. ........ 123/673 |
| 5,682,309 A | * | 10/1997 | Bartusiak et al. ............. 700/29 |
| 5,819,714 A | * | 10/1998 | Bush et al. ................... 123/673 |
| 6,029,099 A | * | 2/2000 | Brown ......................... 700/245 |
| 6,064,809 A | * | 5/2000 | Braatz et al. ................... 703/2 |
| 6,289,508 B1 | * | 9/2001 | Erickson et al. ............. 717/153 |
| 6,330,483 B1 | * | 12/2001 | Dailey ........................... 700/28 |
| 6,439,469 B1 | * | 8/2002 | Gruber et al. .............. 237/8 R |
| 6,594,620 B1 | * | 7/2003 | Qin et al. .................... 702/185 |
| 6,882,889 B2 | * | 4/2005 | Fuller et al. ................... 700/44 |
| 7,082,305 B2 | * | 7/2006 | Willars et al. ............... 455/441 |
| 7,152,023 B2 | * | 12/2006 | Das ................................ 703/2 |
| 2004/0049295 A1 | * | 3/2004 | Wojsznis et al. .............. 700/28 |
| 2004/0049299 A1 | * | 3/2004 | Wojsznis et al. .............. 700/29 |

* cited by examiner

*Primary Examiner*—M. N. Von Buhr
(74) *Attorney, Agent, or Firm*—Carlson, Gaskey & Olds

(57) ABSTRACT

The present invention provides an algorithm that does not relax the problem at the very onset, even if $x_f$ is infeasible. Instead, it solves the EQP with the initial guess for the active set without relaxing the problem. If this solution to the first EQP is not optimal, but nevertheless feasible, we can use this as our guess for the feasible point. This has the advantage of being a feasible point that is consistent with the initial active set, whereas the initial guess used in the previous method is not necessarily so.

15 Claims, 1 Drawing Sheet

SYSTEM AND METHOD FOR EXPLOITING A GOOD STARTING GUESS FOR BINDING CONSTRAINTS IN QUADRATIC PROGRAMMING WITH AN INFEASIBLE AND INCONSISTENT STARTING GUESS FOR THE SOLUTION

This invention was conceived in performance of U.S. Navy Contract No. N 00019-02-C-3003. The government may have certain rights in this invention.

BACKGROUND OF THE INVENTION

The present invention efficiently solves quadratic programs in real time. Such quadratic programs need to be solved to determine the best actuator commands to meet performance goals while satisfying constraints in Dynamic Inversion or Model Predictive Control of a dynamical system.

Time varying systems can be modeled by a set of linearized algebraic equations that relate the outputs and performance indices of the system to the inputs at every instant in time (in a nonlinear dynamical system, these equations change at every time instant). These inputs are formally known as control variables, because the values of these variables are under the control of the operator. The aim is to find the best sequence of control variables in time that maximize the performance indices of the system. In addition, the physical constraints of the system must be honored in order to prevent critical system failure. The problem of determining the best sequence of control variables requires solving a sequence of optimization problems in time, i.e., a new optimization problem at every instant in time. Each such optimization problem must be solved almost instantaneously. For the Dynamic Inversion application in systems with fast dynamics, this allows only a few milliseconds. Hence the requirement that the optimization technique come up with a solution swiftly is key in these applications. Two co-pending applications, "Real-Time Quadratic Programming For Control Of Dynamical Systems," Ser. No. 10/308,285, filed Dec. 2, 2002, and "System and Method of Accelerated Active Set Search for Quadratic Programming in Real-Time Model Predictive Control," Ser. No. 10/367,458, filed Feb. 14, 2003, the assignee of which is the assignee of the present invention, describe improved techniques for obtaining solutions efficiently.

The solution is restricted to a convex form, in general, and sometimes to quadratic programming, in order to ensure that a unique optimal solution exists, there are no local minima or maxima, and that the solution can be found with reasonable computation.

The algorithm also uses the active set method for solving realtime convex optimization problems, where the active set of a prior solution is "fedback" to initialize the search for the best active set in the current problem. This envisions application in a control system where the control solution is periodically updated at a high enough frequency that there is only little change from one update to the next. However, there are certain difficulties if the initial guess for the solution (the actuator commands) is infeasible and/or not consistent with the initial guess for the active set.

If the initial guess for the quadratic program is not feasible, the prior technique introduces an extra variable t (the big-K formulation). If a constraint that should be in the optimal active set is infeasible, it is relaxed, and the final solution from the big-K relaxed problem will always violate this constraint (setting the linear penalty with M>0 can correct for this).

There is a strong argument in favor of retaining consistency during the iterations, because otherwise the objective function may increase from one iteration to another, and a constraint may not satisfy the right hand side exactly even when it is declared active. Moreover, with an inconsistent start, if the solution to the first EQP violates any of the constraints, the current point becomes a convex combination of the EQP solution and $x_f$ (the initial guess for the feasible solution). Any constraint in the first active set that $x_f$ does not satisfy exactly must be dropped if consistency between the current iterate x and the active set were to be retained. This results in potentially promising constraints being dropped from the active set, thus losing the benefit of a good active set hot start.

SUMMARY OF THE INVENTION

The present invention provides an algorithm that does not relax the problem at the very onset, even if $x_f$ is infeasible. Instead, it solves the EQP with the initial guess for the active set without relaxing the problem. Call this solution x_eqp1. Very often, this turns out to be the optimal solution, because the initial guess for the active set is the one from the previous time point, and in a large proportion of the QPs, the previous active set is optimal.

If this solution to the first EQP, $x\_eqp_1$, is not optimal, but nevertheless feasible, we can use this as $x_f$, our guess for the feasible point. This $x\_eqp_1$ has the advantage of being a feasible point that is consistent with the initial active set, whereas the $x_f$ used in the previous method is not necessarily so.

There are "critical constraints" that cannot be violated by the solution from the QP solver under any circumstance. It is evident that the set of critical constraints have to be such that a feasible solution exists in the first place. E.g., a set of such critical constraints can be the set of lower and upper limits on actuators, also known as 'variable bound constraints' in optimization terminology. It is a requirement imposed on the guess for the initial feasible point $x_f$ that it must not violate any critical constraint.

In the situation where the solution to the first EQP, $x\_eqp_1$ is neither optimal nor feasible, if it still satisfies the critical constraints we can use $x\_eqp_1$ as $x_f$, and relax the non-critical constraints that are violated by introducing the extra variable t. This $x_f$ has the advantage of being consistent with the initial active set, while guaranteeing non-violation of the critical constraints. The next set of working constraints is chosen to be the initial working set, minus the constraints for which the multipliers are negative.

If $x\_eqp_1$ does violate the critical constraints, the projection of $x\_eqp_1$ onto the set of critical constraints is computed (call it $x_p$), and this becomes the new guess for the feasible solution. Now, the elements of v (the vector denoting which constraints should be relaxed) and the value of t are manipulated in such a manner that the point $x_p$ is binding for as many of the constraints in the initial active set as possible, thereby retaining consistency of $x_p$ w.r.t. the original constraints in the guess for the active set for which $x_p$ is not strictly binding.

BRIEF DESCRIPTION OF THE DRAWINGS

Other advantages of the present invention will be readily appreciated as the same becomes better understood by reference to the following detailed description when considered in connection with the accompanying drawings wherein:

The FIGURE illustrates one type of control system that uses the quadratic programming method of the present invention.

DETAILED DESCRIPTION OF A PREFERRED EMBODIMENT

The Generic Problem

Figure 1:
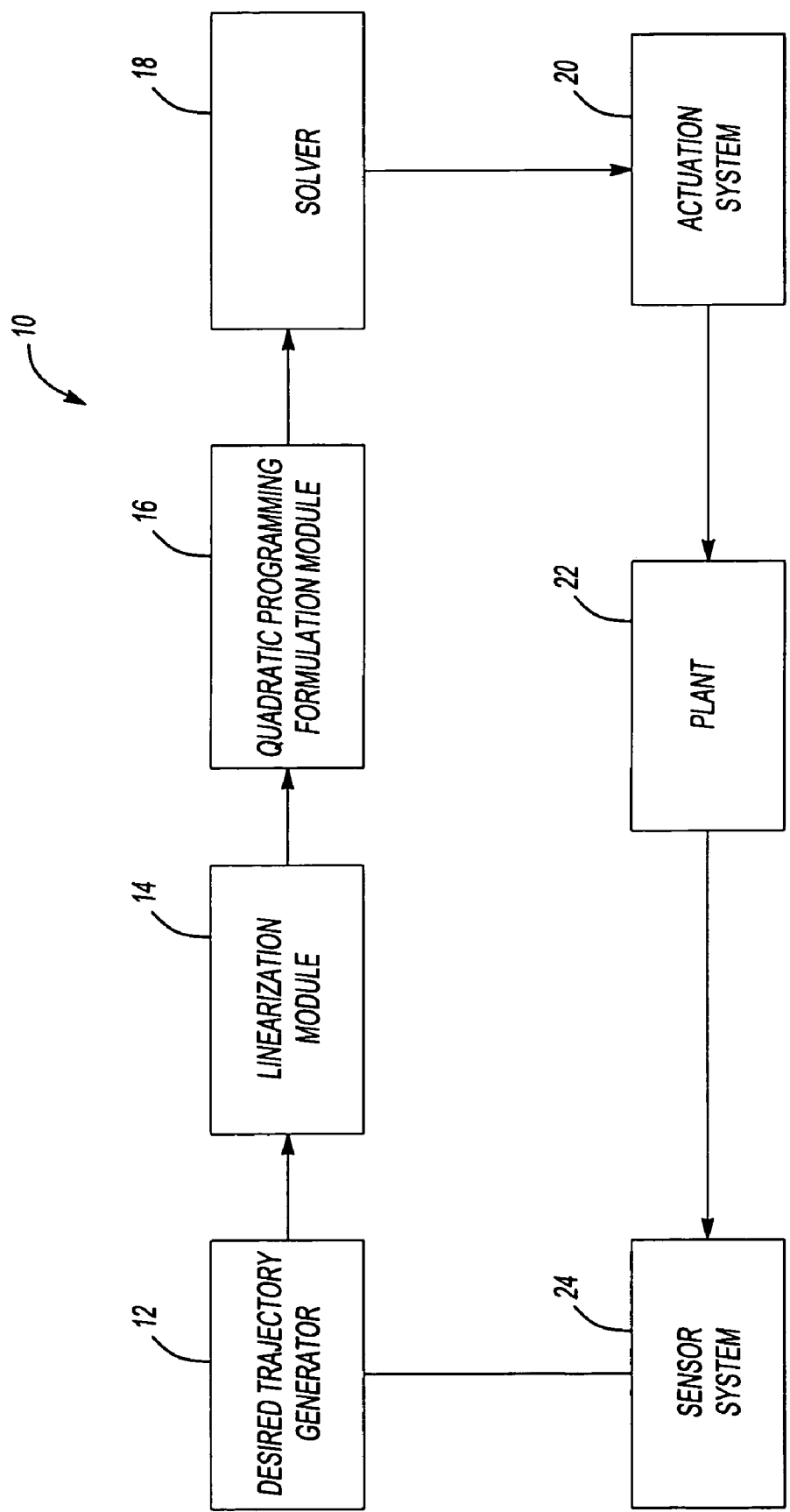

FIG. 1 is a generic model of a control system 10 using Model Predictive Control and of a type that would benefit from the present invention. The control system 10 includes a desired trajectory generator 12 which creates a desired profile of the outputs of the system 10. A linearization module 14 derives a linearized model about the desired trajectory from the desired trajectory generator 12. A quadratic Programming formulation module 16 forms a quadratic program to determine a control profile for best attaining the desired trajectory while respecting any constraints. The Quadratic Programming Solver 18 solves the optimization problem established by the formulation module 16 to generate a profile of the optimal controls. The Quadratic Programming Solver 18 is the focus of this invention. The profile of the optimal controls is sent to an actuation system 20, which acts on the plant 22 of the system 10. The sensor system 24 provides feedback from the plant 22 to the desired trajectory generator 12.

The forthcoming formulation of the optimization problem for the MPC is included here only for the sake of completeness. To further simplify the presentation, we have considered only a "one-time step ahead" MPC, or the constrained dynamic inversion problem, elaborated in U.S. Pat. No. 6,882,889. The full MPC problem can also be formulated and solved using the active set method described in "System and Method of Accelerated Active Set Search for Quadratic Programming in Real-Time Model Predictive Control," Ser. No. 10/367,458, filed Feb. 14, 2003. The following formulation is only one possible representation of the Model-Predictive control problem, intended to illustrate how we get to a Quadratic Program, and not to claim an innovation in deriving the Quadratic Program.

Consider a dynamical system with state variables $\xi$, control variables u, and outputs y, described by the linearized system as below (this can be a linear system, or the linearized version of a nonlinear dynamical system):

$$\frac{d\xi}{dt} = A_1\xi + B_1 u \qquad (1)$$
$$y = C\xi + Du$$

We would like to determine how to deliver a change in control so that we achieve a desired change in the outputs. The problem is best handled in the discrete time version of the above linear system, where the subscript t represents each discrete time point:

$$\Delta\xi_t = A_1\xi_{t-1} + B_1 u_{t-1}$$
$$\Delta y_t = C\Delta\xi_t + D\Delta u_t \qquad (2)$$

Here $\Delta u_t = u_t - u_{t-1}$ represents the change in the control variable required to produce a desired change $\Delta y_t = v$ in the outputs.

The quadratic objective we can minimize to achieve this is $$(\Delta y_t - v)^T V(\Delta y_t - v)$$

The minimization must be performed subject to the system equations (2) being satisfied. Here V represents a diagonal matrix of positive weights on the each of the output goals. We also add similar goal terms for the state variables and control variables. These secondary objectives have small, but always non-zero weights, to preserve strict convexity of the problem.

The equality constraints posed by the system equations (2) can be eliminated by substituting $\Delta\xi_t = A_1\xi_{t-1} + B_1 u_{t-1}$ in the second equation in (2), thereby deriving $$\Delta y_t = D\Delta u_t + CA_1\xi_{t-1} + CB_1 u_{t-1} \qquad (3)$$

This establishes that the change in outputs can be expressed solely in terms of $\Delta u_t$.

Additional inequality constraints on the outputs and inputs, including physical limits and rate limits, can also be expressed all in terms of $\Delta u_t$. in the form $$A\Delta u_t \leq b \qquad (4)$$

The Quadratic Program

Combining the objective and the constraints, we arrive at a strictly convex quadratic program (QP). After replacing the optimization variable $\Delta u_t$ with x to avoid cumbersome notation, we can write the QP as below:

$$\min \frac{1}{2} x^T H x + c^T x$$

subject to $$Ax \leq b$$

Algorithm for Searching for the Optimal Active Set

Active set algorithms search iteratively for the set of binding constraints at optimality, usually referred to as the active set. For model-predictive control problems, the solution to the MPC problem in the current time step provides a guess for the optimal active set in the next time step. This particular guess is used to great advantage to cut down the number of iterations required for solving the QP to convergence, a feature that is practically indispensable in real-time control. The broad steps of the active set algorithm are sketched below, and the associated linear algebra is elaborated in the following section.

Start off with a guess for an active set. We will denote the set of indices of constraints in the active set by W, and also characterize by E the rows in the constraint matrix A corresponding to the guessed active set. Assume a feasible point $x_f$ is known, i.e., $Ax_f \leq b$.

In iteration k, given a guess E for the active constraints, solve the Equality-Constrained QP (EQP)

$$\min_x \frac{1}{2} x^T H x + c^T x \qquad (7)$$
$$s.t. \ Ex = r,$$

where r represents the sub-vector of right hand sides for the active constraints. The optimal solution x*, and Lagrange multipliers $\lambda^*$ are given by $$\begin{bmatrix} H & E^T \\ E & 0 \end{bmatrix} \begin{bmatrix} x^* \\ \lambda^* \end{bmatrix} = \begin{bmatrix} -c \\ r \end{bmatrix} \quad (8)$$

Ratio Test Determine largest $\alpha \in [0,1]$ such that $x_{k-1}+\alpha s$ is feasible, where $s=x^*-x_{k-1}$, and $x_{k-1}$ denotes the prior iterate. In other words, $\alpha$ is picked to be the largest value in $[0,1]$ such that $Ax_{k-1}+\alpha As \leq b$. This test need not be performed for constraint indices i that are in the active set, since they have $As_i=0$ (or $As_i \leq 0$ in iteration 1), and the prior iterate $x_{k-1}$ is feasible. (note: It is possible to have degenerate constraints not in the active set that have $As_i=0$, and the ratio test over such constraints would also be skipped.) Thus $\alpha$ is given by $$\alpha = \min_{i \notin W} \frac{b_i - (Ax_{k-1})i}{As_i}$$

Update the guess for the active set in the next iterate.
  Add to W the first index $i_B$ corresponding to which $\alpha$ achieves its minimum value in the ratio test, the guess for the active indices in the next iterate. The corresponding constraint is loosely referred to as the 'tightest constraint'.
  If there exist constraints for which the Lagrange multiplier $\lambda^*$ in the EQP (7) is negative, drop the constraint with the most negative multiplier from the active set. This is the so-called steepest edge rule. Bland's Rule is deployed whenever degeneracy is detected in the active set, and in these instances, the first constraint with a negative multiplier is dropped. Details on treatment and detection of degeneracy appear later in this disclosure.
  Special case for first iteration Define a constraint in the initial active set to be consistent if the constraint is binding at $x_f$. If in the first iteration $\alpha<1$, then all constraints that are not consistent are dropped, irrespective of the sign of their multiplier. This is because if $Ex_f \leq r$ with strict inequality for some components, the updated iterate $x_1=x_f+\alpha(x^*-x_f)$ does not satisfy $Ex_1=r$ for all constraints in the active set for the next iteration, leading to a discrepancy. This is the consistent active set method (described in earlier patent) For example, if $x_f$ is in the strict interior of the feasible set, this could lead to dropping all the constraints and re-starting with an empty active set, thereby allowing little exploitation of 'hot start'. However, if $x_f$ is the set of optimal controls obtained by solving the MPC problem at the prior time step, it is usually consistent with the initial guess for the active set.

The Inconsistent Active Set Method

In some cases, the known feasible point is largely inconsistent with the starting guess for the active set. This leads to many inconsistent constraints being dropped from the active set at the end of the first iteration. If the initial hot start guess is a good one, many iterations are wasted in picking these constraints back up. Thus another approach is to retain the inconsistent constraints in the active set and continue the search for the optimum even though the iterate and the active set disagree. This inconsistency disappears if in any iteration $\alpha=1$. Moreover, the degree of inconsistency reduces at every iteration. The inconsistent method usually allows far more rapid convergence to the optimum than the consistent method.

Update the Iterate $$x_k = x_{k-1} + \alpha s.$$

Convergence to the global optimum is achieved when $\alpha=1$ and $\lambda^* \geq 0$, i.e., when the active set does not change.

If the allowed time within the real-time interval is exhausted before convergence is reached, the last updated iterate is returned as the solution.

This invention deals with the issue of retaining as much consistency as possible while hot starting, and exploiting the 'big-M' relaxation to keep as many constraints consistent as possible with respect to the iterate.

There is a strong argument in favor of retaining consistency during the iterations, because otherwise the objective function may increase from one iteration to another, and a constraint may not satisfy the right hand side exactly even when it is declared active.

Moreover, with an inconsistent start, if the solution to the first EQP violates any of the constraints, the current point becomes a convex combination of the EQP solution and $x_f$ (the initial guess for the feasible solution). Any constraint in the first active set that $x_f$ does not satisfy exactly must be dropped if consistency between the current iterate x and the active set were to be retained. This results in potentially promising constraints being dropped from the active set, thus losing the benefit of a good 'active set hot start'.

This invention corrects for these deficiencies. Below is a description of the innovative approaches:

Let us first describe the "Big-K/M" relaxation needed for handling infeasible starts, described as part of an earlier patent. If the initial guess $x_f$ is not feasible, the problem is relaxed by introducing an extra variable t:

Minimize $0.5x^THx+c^Tx+0.5Kt^2+Mt$ x,t subject to $Ax-vt<=b$ $t>=0$ (not needed if $M=0$)

This algorithm does not relax the problem at the very onset, even if $x_f$ is infeasible. Instead, it solves the EQP with the initial guess for the active set without relaxing the problem. Call this solution $x\_eqp_1$. Very often, this turns out to be the optimal solution, because the initial guess for the active set is the one from the previous time point, and in a large proportion of the QPs, the previous active set is optimal. The method practiced currently could end up relaxing some of these active constraints if $x_f$ is infeasible, and thus not arrive at the true optimum despite the fact that the initial guess for the active set is actually optimal.

If this solution to the first EQP, $x\_eqp_1$, is not optimal, but nevertheless feasible, we can use this as $x_f$, our guess for the feasible point. This $x\_eqp_1$ has the advantage of being a feasible point that is consistent with the initial active set, whereas the $x_f$ used in the previous method is not necessarily so.

Honoring critical constraints while maintaining consistency: To further elaborate, let us introduce the notion of 'critical constraints'. These are constraints that cannot be violated by the solution from the QP solver under any circumstance. It is evident that the set of critical constraints have to be such that a feasible solution exists in the first place. E.g., a set of such critical constraints can be the set of lower and upper limits on actuators, also known as 'variable bound constraints' in optimization terminology. (It is a requirement imposed on the guess for the initial feasible point $x_f$ that it must not violate any critical constraint.)

Now let us consider the case where the solution to the first EQP, $x\_eqp_1$ is neither optimal nor feasible. If it still satisfies the critical constraints we can use $x\_eqp_1$ as $x_f$, and relax the non-critical constraints that are violated by introducing the extra variable t. This $x_f$ has the advantage of being consistent with the initial active set, while guaranteeing non-violation of the critical constraints. The next set of working constraints is chosen to be the initial working set, minus the constraints for which the multipliers are negative.

If $x\_eqp_1$ does violate the critical constraints, the projection of $x\_eqp_1$ onto the set of critical constraints is computed (call it $x_p$), and this becomes the new guess for the feasible solution. Now, the elements of v (the vector denoting which constraints should be relaxed) and the value of t are manipulated in such a manner that the point $x_p$ is binding for as many of the constraints in the initial active set as possible, thereby retaining consistency of $x_p$ w.r.t. the original constraints in the guess for the active set for which $x_p$ is not strictly binding.

The logic for the last step can be described as below. For our implementation we have assumed that $t=t_f=1$ in the initial iteration, even though it is not essential.

If $x_p$ violates a constraint $a_i{}^*x_p<=b_i$ in the initial active set, it is relaxed with a choice of $v_i>0$ such that $a_i{}^*x_p-v_i{}^*t_f=b_i$.

If $x_p$ violates a constraint $a_i{}^*x_p<=bi$ not in the initial active set, it is relaxed with a choice of $v_i>0$ such that $a_i{}^*x_p-v_i{}^*t_f<b_i$.

If $x_p$ does not violate a constraint it is not relaxed. If it happened to be in the initial active set, and is still binding, it is retained in the active set, and dropped otherwise.

If the number of constraints in the working set after the above procedure is more than the maximum allowed, the least infeasible constraints are dropped from the active set.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A method for controlling a multivariable system including the steps of:
    a) receiving a plurality of sensor signals indicating current conditions of the system;
    b) receiving a plurality of commands;
    c) determining the desired dynamic response of the system based upon the commands and the sensor signals;
    d) in each of a plurality of time steps, formulating a problem of controlling the system to achieve the desired dynamic response as a solution to a quadratic programming problem;
    e) solving the quadratic programming problem in each time step using an iterative algorithm which searches for an optimal active set, wherein the active set comprises a set of constraints that are binding at an optimized solution; and
    f) in each subsequent time step of the plurality of time steps:
    g) solving the quadratic programming problem based on a final active set of a prior time step of the plurality of time steps to obtain $x_f$;
    h) initializing a search for the optimal active set based on the final active set of the prior time step of the plurality of time steps and based upon the assumption that $x_f$ is feasible.

2. The method of claim 1 wherein said step h) is performed without relaxing any of the active constraints.

3. The method of claim 1 wherein said step h) is performed without relaxing a plurality of the active constraints.

4. The method of claim 3 further including the steps of, in each subsequent time step in said step f):
    i) determining that $x_f$ is feasible, but not optimal, after said step g) and using $x_f$ in said step h) based upon the determination that $x_f$ is feasible.

5. The method of claim 1 wherein the constraints include a plurality of critical constraints and a plurality of non-critical constraints, the method further including the steps of, in one of the plurality of subsequent time steps in said step f):
    i) determining that $x_f$ is not feasible, after said step g);
    k) relaxing at least one of the plurality of non-critical constraints based upon the determination that $x_f$ is not feasible.

6. The method of claim 5 further including the steps of:
    l) determining that $x_f$ does not violate the critical constraints; and
    m) based upon said step l), using a next set of working constraints as the initial working set, minus the constraints for which an associated Lagrange multiplier is negative.

7. The method of claim 5 further including the steps of:
    l) determining that $x_f$ violates at least one of the critical constraints; and
    m) based upon said step l), using a projection of $x_f$ onto the plurality of critical constraints, $x_p$, as a new guess for the solution.

8. The method of claim 7 wherein v is a vector denoting which constraints should be relaxed, and wherein the plurality of non-critical constraints are relaxed in said step k) by introducing an additional variable t, the method further including the steps of:
    based upon the determination in said step l) that $x_p$ violates at least one of the critical constraints, altering the vector v and the value of t to maximize the number of constraints for which $x_p$ is binding in the initial active set.

9. A control system comprising:
    a desired trajectory generator for creating a desired trajectory;
    a linearization module deriving a linearized model about the desired trajectory;
    a quadratic programming module in each of a plurality of time steps, formulating a problem of controlling the system to achieve the desired dynamic response as a solution to a quadratic programming problem;
    a quadratic programming solver for solving an optimization problem established by the quadratic programming module to generate a profile of optimal controls, the quadratic programming solver solving the quadratic programming problem in each time step using an iterative algorithm which searches for an optimal active set and in each subsequent time step of the plurality of time steps, the quadratic programming solver in each subsequent time step of the plurality of time steps solving the quadratic programming problem based on a final active set of a prior time step of the plurality of time steps to obtain $x_f$, the quadratic programming solver initializing a search for the optimal active set based on the final active set of the prior time step of the plurality of time steps and based upon the assumption that $x_f$ is feasible.

10. The system of claim 9 wherein the quadratic programming solver initializes the search for the optimal active set without relaxing any of the active constraints.

11. The system of claim 9 wherein the quadratic programming solver, in each subsequent time step, determines that $x_f$ is feasible, but not optimal.

12. The system of claim 9 wherein the constraints include a plurality of critical constraints and a plurality of non-critical constraints, the quadratic programming solver programmed to, in one of the plurality of subsequent time steps: determine whether $x_f$ is feasible, relax at least one of the plurality of non-critical constraints based upon the determination that $x_f$ is not feasible.

13. The system of claim 12 wherein the quadratic programming solver is programmed to determine whether $x_f$ violates the critical constraints and if not, to use a next set of working constraints as the initial working set, minus the constraints for which an associated Lagrange multiplier is negative.

14. The system of claim 12 wherein the quadratic programming solver is programmed to determine whether $x_f$ violates the critical constraints and if so, use a projection of $x_f$ onto the plurality of critical constraints, $x_p$, as a new guess for the solution.

15. The system of claim 14 wherein v is a vector denoting which constraints should be relaxed, and wherein the plurality of non-critical constraints are relaxed by introducing an additional variable t, the quadratic programming solver programmed to alter the vector v and the value of t to maximize the number of constraints for which $x_p$ is binding in the initial active set based upon the determination that $x_p$ violates at least one of the critical constraints.

* * * * *